United States Patent
Reeves

[11] 3,765,500
[45] Oct. 16, 1973

[54] AUTOMOTIVE TRACTOR UNIT WITH TILTOVER TYPE CAB CONSTRUCTION

[76] Inventor: Marvin O. Reeves, Rte. No. 1, Augusta, Kans. 67010

[22] Filed: Dec. 29, 1971

[21] Appl. No.: 213,261

[52] U.S. Cl............ 180/77 TC, 180/69 R, 180/89 A
[51] Int. Cl............................................. B62d 33/06
[58] Field of Search............ 180/69 R, 69 C, 77 TC, 180/89 A; 296/28 C, 76; 254/93 VA, 124

[56] References Cited
UNITED STATES PATENTS

| | | | |
|---|---|---|---|
| 2,306,348 | 12/1942 | Spear............................. | 180/89 A |
| 2,793,767 | 5/1957 | Smith et al...................... | 254/124 |
| 2,699,223 | 1/1955 | Brumbaugh..................... | 180/89 A |
| 2,854,088 | 9/1958 | Dence............................ | 180/89 A X |
| 2,873,979 | 2/1959 | Venditty et al................. | 180/89 A X |
| 2,148,308 | 2/1939 | Spear............................. | 180/89 A X |
| 3,088,537 | 5/1963 | Le Tourneau.................. | 180/89 A X |
| 3,649,066 | 3/1972 | Steiner et al................... | 180/89 A X |
| 3,419,099 | 12/1968 | Brumbaugh et al............. | 180/69 C |

*Primary Examiner*—Kenneth H. Betts
*Assistant Examiner*—Leslie J. Paperner
*Attorney*—Robert E. Breidenthal

[57] ABSTRACT

An automotive tractor unit inclusive of a tiltover cab type of construction provided with feed lines for cab-mounted instruments that extend along and can twist about the pivotal axis of the cab, together with decouple hydraulic means for actuating pivotal movement of the cab. Means are provided for readily decoupling the cab mounted engine, power train, and steering controls.

11 Claims, 19 Drawing Figures

PATENTED OCT 16 1973 3,765,500

INVENTOR.
MARVIN O. REEVES

BY Robert E. Breidenthal

ATTORNEY

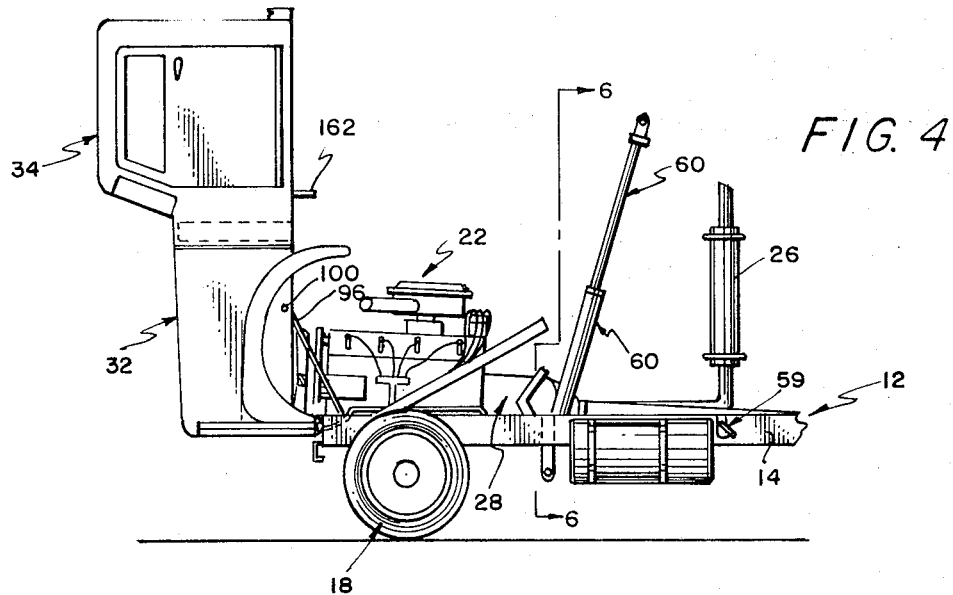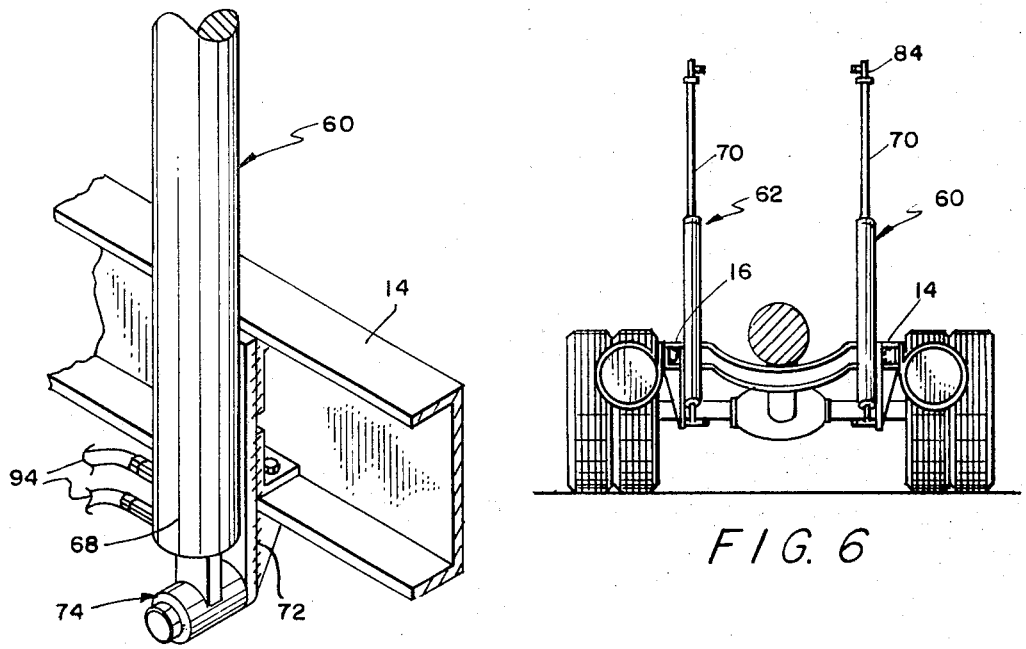

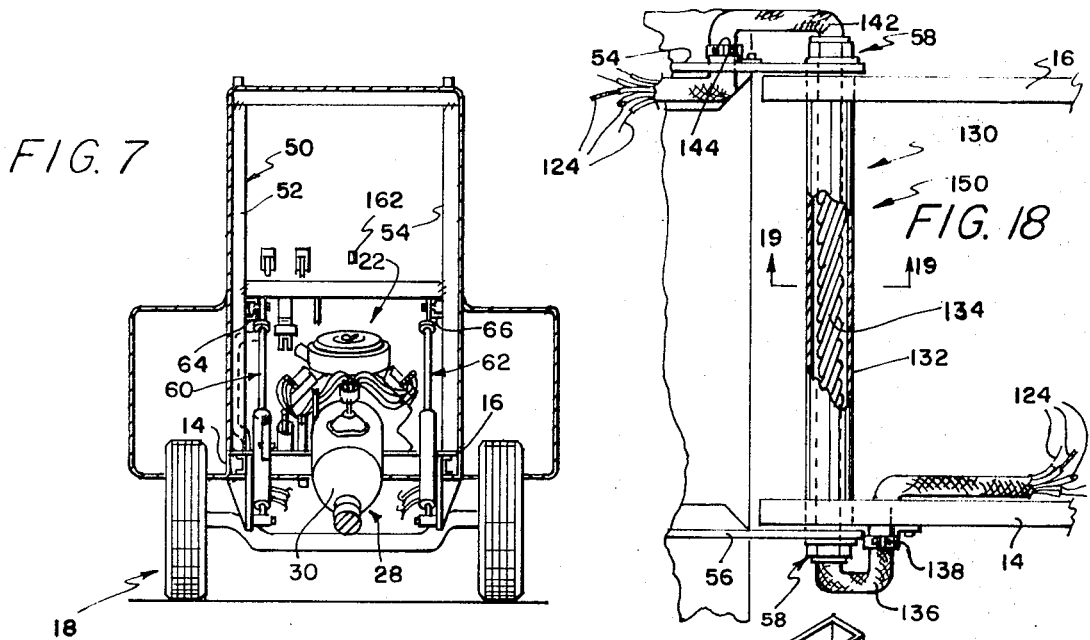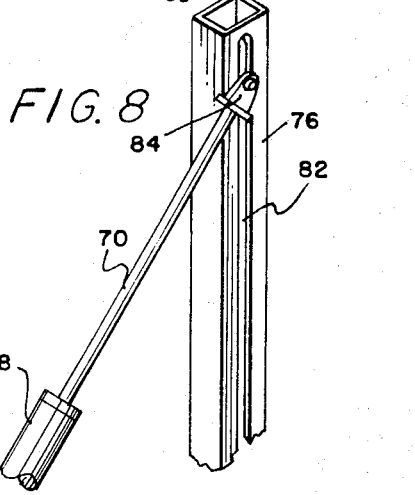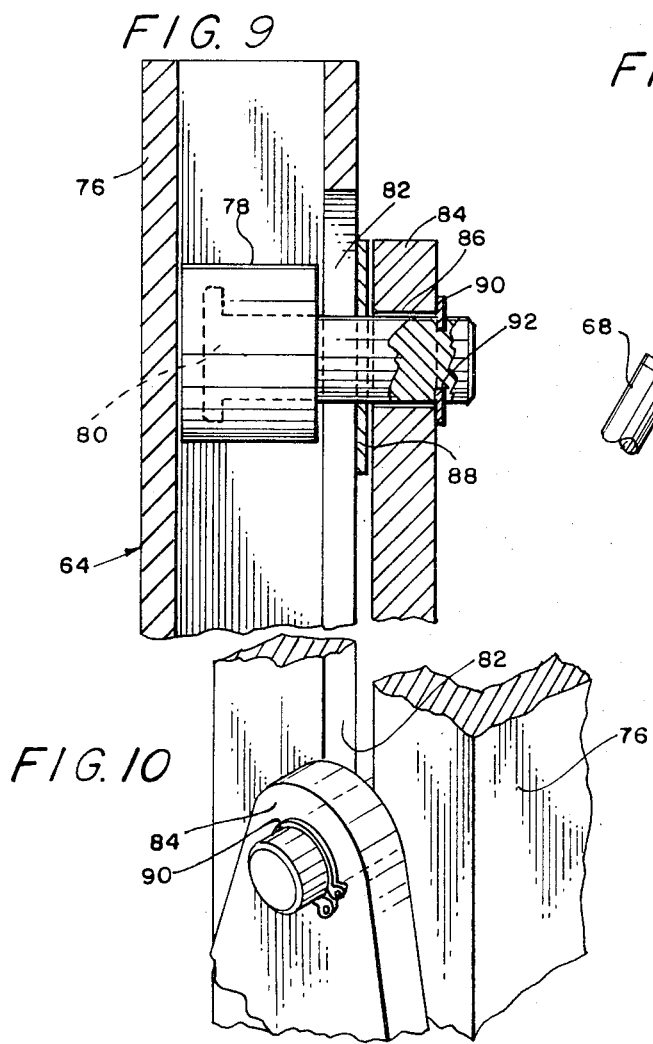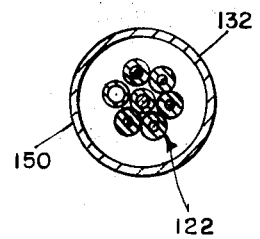

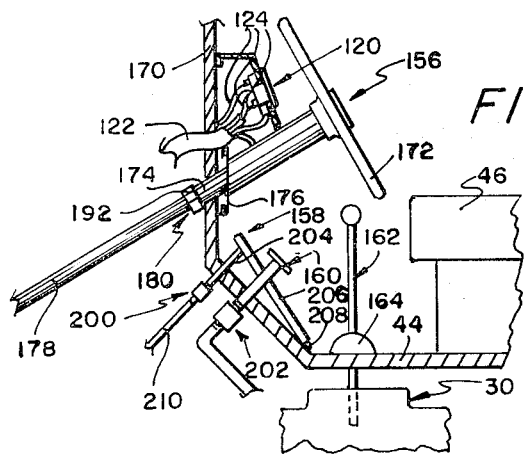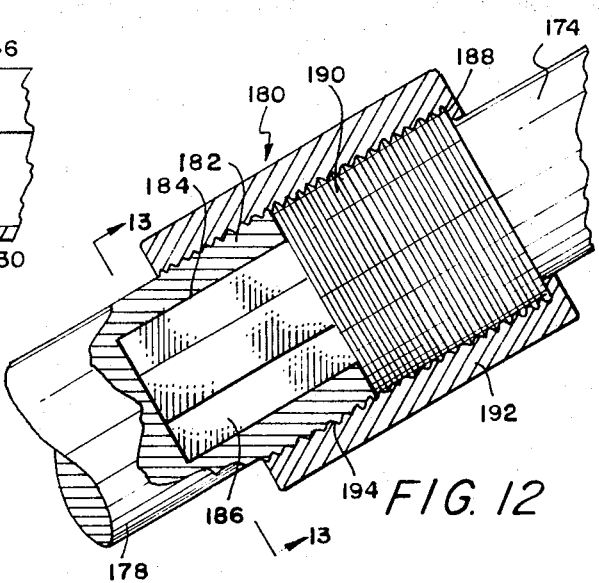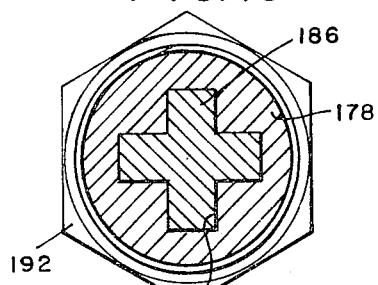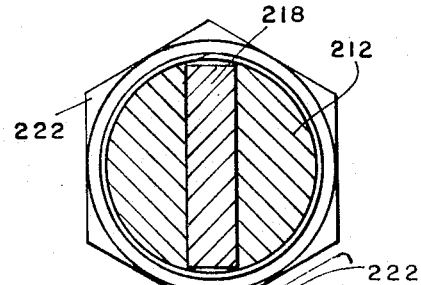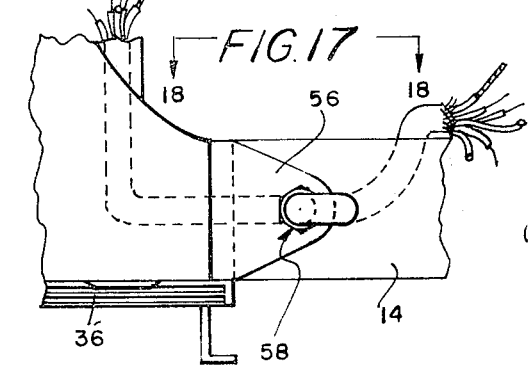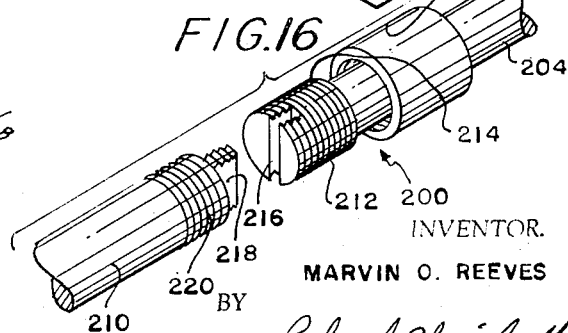

AUTOMOTIVE TRACTOR UNIT WITH TILTOVER TYPE CAB CONSTRUCTION

The present invention relates to new and useful improvements in the automotive tractor units of over the road tractor-trailer trucking or cargo moving combinations, and more particularly pertains to means for tilting the operator's cab and associated structure to afford access to the prime mover and elements of the power train to which access is normally impeded by the cab and associated structure. Such means for tilting the cab are applicable to cab over engine type of constructions, but are specially beneficial with respect to tractors wherein the engine is covered by a hood that is forwardly of the operator's cab. The improvements have to do with the hydraulic tilting system, disposition of a portion of the instrument feed lines along the pivotal axis of the cab, and means for decoupling cab mounted operator controls from the controlled components, such as the steering, brakes, engine, power train, etc.

The present invention generally relates to the art exemplified by U. S. Pat. No. 2,699,223 which issued to Brumbaugh Jan. 11, 1955; U. S. Pat. No. 2,740,487 which issued to Murty et al. Apr. 3, 1956; and U. S. Pat. No. 2,873,979 which issued to Venditty et al. Feb. 17, 1959. Each of such patents disclose tractor units with tilt-over cabs of the type wherein the cab overlies the engine.

The problems encountered in providing tiltover cab constructions wherein the cab overlies the engine are relatively simple as compared to those which are encountered in providing a structure wherein it is desired to provide ready access to the prime mover or engine together with power train components wherein the engine is forwardly of the cab and normally covered by hood structure. Such problems fall in three categories, namely, the provision of practical means for pivotally moving both the hood structure and the operator's cab so as to expose and provide ready access to not only the engine but also power train components; maintaining a continuous connection between cab-mounted instruments and their associated sensing units because of the relatively greater length of such instrument feed lines; and the provision of means for readily decoupling operator controls from the components controlled thereby.

U. S. Pat. No. 3,017,944 which issued to Norrie Jan. 23, 1962 discloses a conventional arrangement of a cab with respect to the engine in that the engine is disposed forwardly of the operator's cab with the engine being provided with a cover or hood structure. It is one of the principal aims of the present invention to provide a cab and engine arrangement such as shown in the Norrie patent with means not only to pivotally swing the hood into an engine exposing position but to also swing the cab into a position exposing power train components for ready repair of replacement.

It is another important aim of the present invention to provide in conjunction with a pivotally mounted cab or cab and hood combination with a feed line system for the cab mounted instruments such that the latter can remain in tact and operative whether the cab and hood be in the normal or in their elevated positions.

Still another important aim of the present invention is to provide means for readily decoupling cab mounted operator controls from the components controlled thereby.

The invention will be best understood and appreciated in the light of the accompanying drawings illustrative of a preferred embodiment thereof, wherein:

FIG. 4 is a view generally similar to FIG. 2 with the hydraulic actuating unit being shown in its decoupled position;

FIG. 5 is an enlarged fragmentary isometric view of the lower end portion of a hydraulic actuating unit showing its pivotal mounting upon the tractor frame;

FIG. 6 is a vertical sectional view taken upon the plane of the broken section line 6—6 in FIG. 4;

FIG. 7 is a vertical sectional view taken upon the plane of the vertical section line 7—7 in FIG. 2;

FIG. 8 is an enlarged fragmentary isometric view of the connection between a hydraulic actuating unit and the camming guide therefor;

FIG. 9 is an enlarged fragmentary sectional detail view of the connection shown in FIG. 8, with hidden details being shown in dashed outline;

FIG. 10 is an enlarged fragmentary perspective view of the structure shown in FIG. 9;

FIG. 11 is a vertical sectional view through the firewall and floorboard of the cab portion of the structure with the operator controls extending thereto and therethrough being fragmentarily illustrated;

FIG. 12 is a substantially enlarged fragmentary elevational view, partially in section, of the decoupling means provided in connection with one of the foot operated controls shown in FIG. 11;

FIG. 13 is a transverse sectional view taken upon the plane of the section line 13—13 in FIG. 12;

FIG. 14 is a greatly enlarged fragmentary elevational detail view of the coupling means provided in association with the steering shaft shown in FIG. 11, with the view being partially in section to reveal the relationship of the parts;

FIG. 15 is a transverse sectional view taken upon the plane of the section line 15—15 in FIG. 14;

FIG. 16 is an exploded isometric view of the coupling means shown in FIGS. 14 and 15;

FIG. 17 is an enlarged fragmentary side elevational view of the pivotal connection between the cab and hood structure with the tractor frame, with hidden details of the instrument feed lines being shown in dashed outline;

FIG. 18 is a fragmentary plan view of a portion of the structure shown in FIG. 17, such view being taken from the plane defined by the line 18—18 in FIG. 17; and, FIG. 19 is an enlarged vertical sectional view taken upon the plane of the section line 19—19 in FIG. 18.

Figure 1:
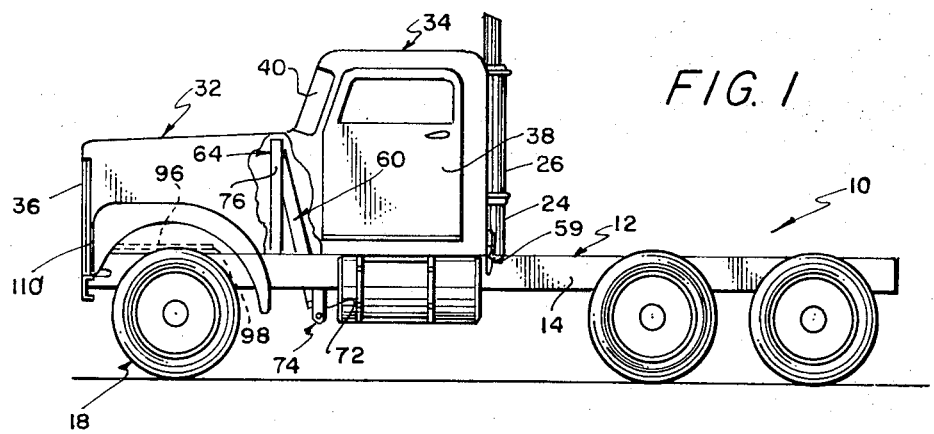
FIG. 1 is a side elevational view of a tractor unit according to the present invention, with portions of the hood structure being removed to expose certain details of the hydraulic tilting system.

Referring now to the drawings wherein like numerals designate like parts throughout the various views, the reference numeral 10 designates generally the tractor unit of the present invention, it being understood that the same can be used in combination with a conventional trailer, not shown, or that the rearward portion of the frame of the tractor 10 can be provided with a cargo bed spaced rearwardly of the operator's cab which will be presently described.

The truck or automotive tractor unit 10 comprises, as is conventional and as is hereinafter expressly indicated, a frame 12 inclusive of longitudinally extending members 14 and 16, a pair of dirigible front wheels 18, pairs of rear driving wheels 20, and a prime mover or engine designated generally at 22. The engine 22 can be a conventional internal combustion engine such as to burn gasoline or diesel fuel (though the invention contemplates and is applicable to other types of prime movers such as turbine engines and the like) and is provided with a vertical exhaust stack 24 that can be provided with a muffler 26.

The engine 22 is connected to the rear driving wheels 20 by a power train designated generally at 28 that may include a clutch and transmission assembly 30. The engine 22 is mounted on the frame 12 adjacent the longitudinal position occupied by the dirigible wheels 18, and the power train 28 extends rearwardly therefrom in the conventional manner.

The truck or tractor unit 10 includes a pivotally mounted or tiltable combination comprised of an engine cover or hood structure designated generally at 32 and an operator's cab or driver enclosure 34. Except as hereinafter pointed out, the hood structure 32 and the operator's cab 34 are conventional with the former including a radiator grill, and the latter including doors 38 and a windshield 40. The interiors of the hood structure 32 and the cab structure 34 are separated by a firewall and the cab structure includes a floor or bottom wall 44 which may be connected to or integral with the firewall as shown in FIG. 11 (wherein the firewall is designated by the reference numeral 170). Also, the cab structure 34 includes a driver or operator's seat 46.

Though not shown it will be understood that the hood structure 32 can if desired be deemed expedient be provided with openings and removable covers therefor so that the engine 22 can be serviced and/or minor repairs made without it being necessary to pivotally move the entire assembly of the hood structure 32 and the cab structure 34.

Figure 2:
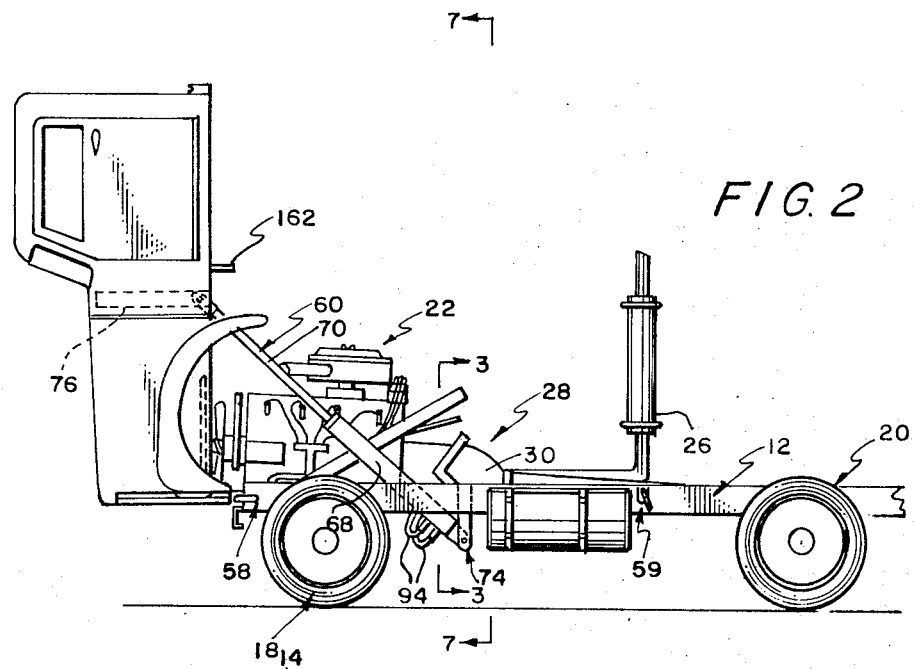
FIG. 2 is a side elevational view of the tractor unit shown in FIG. 1 with the hood and cab shown in the tilted or elevated position exposing the engine and power train components, with certain hidden details being shown in dashed outline.

The integral or combined hood and cab structures 32 and 34 include a frame designated generally at 50 that includes portions 52 and 54 at the opposite sides thereof, and such portions 52 and 54 include forward and lowermost extremities such as the one indicated at 56 in FIG. 17 disposed upon the opposite sides of the truck frame members 14 and 16 and pivoted thereto by axially aligned and spaced pivot means such as the one indicated generally at 58 in FIG. 17, the arrangement being such that the hood and cab structures 32 and 34 can (after the conventional hold down lock or latch means 59 provided at each side of the tractor unit 10 have been operated to suitably release such hood and cab structures) be swung upwardly and forwardly as a unit from the position shown thereof in FIG. 1 to that shown in FIG. 2 about the pivot means 58 as an axis.

Means is provided for actuating pivotal movement of the combined hood and cab structure 32 and 34. Such means comprises identical actuating units 60 and 62 disposed on opposite sides of the tractor unit 10 that respectively coact with cam and guide units 64 and 66 respectively fixed to the tiltable frame elements 52 and 54. Inasmuch as the hydraulic actuating unit 62 and its respective cam and guide means 66 are identical to the corresponding hydraulic actuating unit 60 and its associated cam and guide means 64, it is evident that a detailed description of the hydraulic actuating unit 60 and its associated cam and guide means 64 will suffice also for the corresponding structure 62 and 66.

Figure 3:
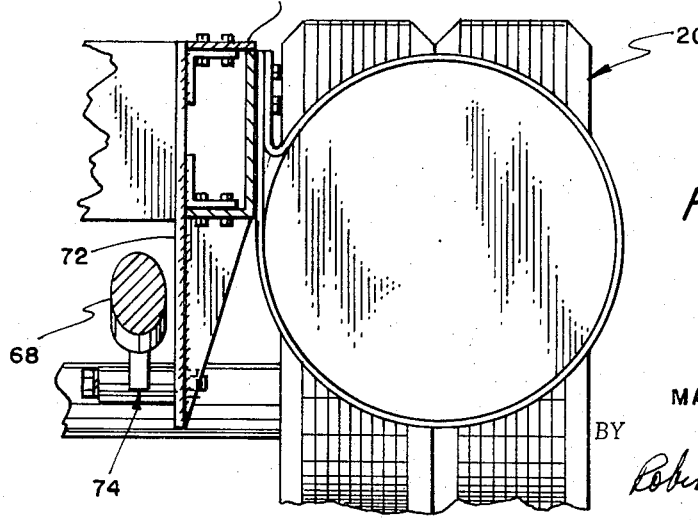
FIG. 3 is an enlarged vertical sectional detail view taken upon the plane of the section line 3—3 in FIG. 2.

Accordingly, the hydraulic actuating units or means 60 comprises a hydraulic cylinder 68 from which extensibly and retractably extends a rod 70. A mounting bracket 72 is rigidly fixed to the truck frame 14 as shown in FIG. 3 so as to depend below the frame member 14, and the lower end of the hydraulic cylinder 68 is pivotally mounted to the lower end portion of the bracket 72 by means indicated generally at 74 for swinging movement about a horizontal axis that is transverse with respect to the longitudinal axis of the tractor 10.

The cam and guide means 64 with respect to which the hydraulic unit 60 coacts comprises an upstanding, hollow member 76 that is of rectangular cross section, such member 76 being normally vertically disposed as shown in FIG. 1 and having its lower end fixedly secured as by welding or the like to the tiltable frame element 14. A roller 78 is vertically movable and rollable within the hollow member 76, and such roller 78 is journaled upon a horizontal pin 80. The hollow member 78 is provided with a vertical slot 82 in one side thereof through which the pin 80 slidably extends. The free end of the hydraulic unit rod 70 is provided with a fitting 84 fixed thereto, such fitting 84 having an opening 86 therethrough through which the pin 80 removably extends. A large washer 88 is disposed about the pin 80 intermediate the member 76 and the fitting 84 as an antifriction means and also for aiding and preserving the horizontal orientation of the axis of the pin 80.

A fitting 84 can be disengaged from the pin 80 (there being sufficient play of the parts to enable such disengagement, especially when the rod 70 is extended); however, such detachment is normally precluded by means of a steel C-shape retainer ring 90 that is removably disposed in a groove 92 provided in the pin 80 as best shown in FIGS. 9 and 10.

The hydraulic cylinder 68 is provided with hydraulic lines 94 that in a conventional manner communicate with suitable valving means, reservoir and pump means, not shown. Whereas the hydraulic unit 60 can be single acting (though a little manual effort might be necessary to initiate lowering of the elevated structure 32 and 34) the hydraulic means 60 is preferably double acting. When the hood and cab structures 32 and 34 are in their normal positions such as shown in FIG. 1, it is evident that the roller 78 is adjacent the upper end of the hollow interior of the member 76 with hydraulic extension of the means 60 serving to push the hood and cab structure 32 and 34 upwardly. As the hood and cab structure 32 and 34 approach the position thereof in FIG. 2, the movable connection or pivot between the tubular member 76 and the hydraulic actuating means 60 results in the roller 78 approaching the lower or rear end of the slot 82, whereby the extent of the pivotal movement of the cab structure 34 is greater than would be otherwise the case. The coaction between the hydraulic means 60 and the tubular member 76 by means of the structure best shown in FIGS. 8, 9 and 10 is such that the tubular member 76 may be considered as a guide and cam structure for the free end of the hydraulic means 60.

When the hood and cab structures 32 and 34 have been swung to the position shown thereof in FIG. 2, the latter may be releasably retained in such position with the hydraulic means or units 60 and 62 being disconnected therefrom so that the hydraulic units 60 and 62 can be placed in the positions shown thereof in FIG. 4 so as to afford even more convenient access to the engine 22 and the power train 28. The means for releasably securing the hood and cab means 32 and 34 in the position shown thereof in FIGS. 2 and 4 comprises a pair of arms 96 (only one of which is visible in the drawings) that are pivotally connected to the frame 12 at 98, with the free ends thereof being movable from the positions shown thereof in FIG. 1 to the position shown thereof at 100 in FIG. 4 in which the same is detachably secured to the frame 50 of the hood and cab structures 32 and 34. When the arms 96 are secured as shown in FIG. 4, the retainer rings 90 can be removed so as to free the hydraulic units 60 and 62 from the means 64 and 66 so that such hydraulic units can be swung to the positions shown thereof in FIG. 4. When the apparatus is in the condition shown in FIG. 4, it will be very clear that easy access can be had to not only the engine 22 but also to all elements of the power train 28 from above that had been covered by the hood and cab structures 32 and 34.

Accessibility to the engine 22 and the power train 28 from above is a great convenience to mechanics in effecting either repair or replacement of defective parts, it being noted that removal and replacement of components can be accomplished by an overhead hoist or crane.

After the necessary repairs or replacements have been effected, the procedure of raising and securing the hood and cab structures 34 as shown in FIG. 4 is simply reversed from that previously described. In other words, the hydraulic units 60 and 62 are respectively again coupled and releasably secured to the means 64 and 66, and the arms 96 are then disconnected from the positions indicated at 100 in FIG. 4 and the arms 96 returned to their normal positions shown in dashed outline in FIG. 1. The hydraulic units 60 and 62 are then actuated to retract and thereby lower the hood and cab structures 32 and 34 to the position shown in FIG. 1, whereupon the latch means 59 are employed to lock the structures 32 and 34 down. Though not shown, it will be understood that conventional rubber or resilient bumpers may be associated in the usual manner with the latch means 59 to limit any shock on the cab being lowered to its operating position, and to prevent any free movement of the cab when locked in its lowered and operative position.

A plurality of instruments 120 are mounted within and are movable with the cab structure 34, such plurality or cluster of instruments being of entirely conventional character and for the purpose of displaying among many other possible things engine speed, engine temperature, oil pressure, fuel, mileage and road speed, etc. Such instruments are provided with a bundle 122 of flexible feed lines and insulated electric conductors 124 of various appropriate character that connect such instruments to appropriate sensing units, it being evident that such feed lines can be flexible fluid pressure conduits, electric conductors, rotatable cable such as in speedometer cables, etc. In addition, the interior of the operator's cab structure 34 may include various indicator lamps and electrical control switches, not shown, whereby through the appropriate electrical conductors (constituting with the instrument feed lines the bundle 122), various indicator lights, head lamps, parking lights, turn signals, etc., can be actuated and/or controlled. Furthermore, the interior of the operator's cab 34 is provided with such items as cigarette lighters, interior dome lamps, etc., not shown, which are connected to electric conductors of the bundle 122, whereby they can be energized.

Since the sensing units of all or nearly all of the conventional panel instruments are connected to components that are not pivotally movable with the cab structure 34 as previously described, and since the conventional sources of electrical energy, not shown, as well as the turn signal lamps and parking lamps, etc., are not pivotally movable with the cab structure 34, means are provided that will maintain the integrity of all of such feed lines, power supply and control conductors 124 included in the bundle 122 during the pivotal movements of the cab structure 34.

The maintenance of the integrity of all the lines, whatever their character, whatever the position of the cab (normal, fully tilted, or hydraulically held at any intermediate position) is highly desirable in that the risk of any failure of any detachable coupling does not have to be incurred, nor are the operations of decoupling and recoupling the lines necessary. Perhaps the most important advantage resides in the fact that all instruments, indicators and controls function in their ordinary fashion whatever the position of the cab structure. This not only facilitates tests of the prime mover and the power train, but also enables checks to be made of the instruments, indicators and other controls.

The means provided for enabling the maintenance of integrity of the various components of the bundle 122 is suitable for conventional cab over engine tractors, but is especially beneficial for use in conjunction with tractors of the illustrated type because of the substantially greater amount of motion or movement between the prime mover and the instrument panel or tilting the cab. Whereas a bit of slack in feed lines might be suitable to accommodate the movement in a cab over engine structure, such a provision may fall far short of an ideal arrangement when attempted in conjunction with tractors of the character illustrated in the drawings.

The means herein provided are designated generally at 130 and comprises, as best shown in FIGS. 17, 18 and 19, a tubular member 132 fixed to and extending between the frame members 14 and 16 in alignment with the transverse horizontal pivotal axis of the cab structure defined by pivot means 58. Each of the pivot means 58 are defined by conventional hollow pins, not shown, and an extent 134 of the bundle 122 extends through the tubular member 132 as well as the hollow pivot means 58 at the opposite ends thereof. One end 136 of the extent 134 of the bundle 122 is fixed at 138 to the frame member 14 so that the components 124 of the bundle 122 can, without any necessity for substantial flexibility (to accommodate motion about the pivotal axis of the cab), extend therefrom for connection to sensing units of the prime mover, electrical energy sources, etc.

The other end 142 of the bundle extent 134 is fixed to the cab frame 54 so that the components 124 can be connected to the instruments 120, etc., of the cab without any need for substantial flexure to accommodate pivotal motion of the cab.

The extent 134 of the bundle 122 in the sleeve 132 is subject to twisting about its axial extent during pivotal movement of the cab inasmuch as its opposite ends 136 and 142 are fixed relative to the tractor frame and the pivotally mounted cab. The axial extent of the extent 134 easily accommodates the twisting which at most is between 90° and 180°. To more easily accommodate the twisting of the flexible components 140 of the extent 134, the latter is provided with a somewhat loose initial twist as clearly shown. The extent 134 can optionally be provided with a flexible and twistable sheath 150; however, such provision is not necessary as adequate support and protection are provided by the tubular member 132.

While means 130 described above enables constant connection of instruments etc., to the engine, etc., it is for the most part desirable and/or necessary to decouple vehicle operator controls such as steering means 156, carburetor or fuel injection foot control 158, clutch (or brake) foot control 160. The gear shifting controls 162 conventionally associated with the transmission 30 of the power train 28 extend upwardly through a suitable opening, now shown, in the cab floor 44, so that such controls need not be decoupled, it being noted that such gear shifting or transmission controls 162 extend or can be moved to extend in a direction generally tangential to the pivotal movement of the portion of the floor 44 through which it extends. A flexible boot 164 disposed about the control 162 serves to make an effective seal between the floor 44 and the control 162 when the cab is lowered into its operative position.

As clearly shown the floor 44 of the cab is integral with an upstanding firewall 170 through which the bundle 122 extends. The steering means 156 includes a steering wheel 172 mounted on a steering post 174 that is journaled at 176 through the wall 170. As will be understood, the steering post 174 is normally connected to dirigible wheels 18 for steering the tractor 10. Such connection includes a steering post 178 and in the present invention, such posts 174 and 178 are detachably coupled by means 180 for causing the post 178 to turn in unison with the post 174. Such means 180 comprises the post 178 having an externally threaded end portion 182 that has a socket 184 therein of cruciform shape for removably receiving a complementary male shaped end portion 186 of the post 174. The post 174 is radially enlarged adjacent the cruciform portion 186 as shown to define a shoulder 188, and such enlarged portion is threaded as indicated at 190. A sleeve 192 internally threaded as indicated at 194 threadingly engages the threaded portions of the posts 174 and 178, such sleeve having a lip or flange 196 that is seated against the shoulder 188 when the coupling 180 is tightened down. The manner of decoupling the means 180 will be apparent on its being understood that the rotary mounting 176 of the post 174 accommodates sufficient axial movement of the post 174 to disengage the male cruciform portion 186 of the post 174 from within the socket 184 when the sleeve 192 is loosened.

The operator controls 158 and 160 are respectively provided with decoupling means 200 and 202. Since the means 200 and 202 are structurally similar to each other a description of the means 200 will suffice for both. The control 158 (as is also true of the control 160) includes a rod or shaft 204 reciprocably extending through the firewall 170 in the usual manner. Movement of the shaft 204 is controlled by foot pedal 206 that is pivotally connected thereto and also to the firewall 170 at 208.

The shaft 204 is connected to the prime mover by means that includes a rod or shaft 210. The means 200 comprises an end of the shaft 204 being radially enlarged and threaded at 212 and defining a shoulder 214. The threaded end portion 212 is provided with a slot 216 which removably accommodates a male end portion 218 of the shaft 210. The shaft 210 including the male extension 218 are externally threaded at 220. An internally threaded at 220. An internally threaded sleeve 22 threadingly joins the threaded end portions of the shafts 204 and 210 as shown, with the sleeve 222 having a flange 224 that seats against the shoulder 214.

From the foregoing it will be seen that there has been provided tilting means for a tiltable cab structure suitable for such structures whether of the sleeper type or not, and whether of the cab over engine type or not. Furthermore, there has been disclosed a means for operatively and continuously connecting by electrical conductors, rotary cables, fluid pressure conduits, various parts or units that move relatively to each other about a pivotal axis.

Attention is now directed to the appended claims for an appreciation of the actual scope of the invention.

I claim:

1. In a self propelled vehicle of the type that includes a wheeled frame with a motive power system supported on the frame, a vehicle operator cab pivotally mounted on the frame for movement between an operating position that substantially obstructs ready maintenance access to the motive power system from above the latter and a maintenance position exposing the motive power system for ready maintenance access from above the latter, with the cab having fixed thereto and pivotally movable therewith a plurality of indicating means that are operatively connected by a plurality of elongated and flexible means to a plurality of associated sensors therefor that are carried by and which remain substantially fixed in position relative to the frame and the motive power system; the improvement comprising said plurality of elongated and flexible means having a common bundled extent that extends between first and second positions, with said first and second positions being spaced along said pivotal axis, said bundled extent of the flexible and elongated means being fixed against movement relative to the frame and to the cab at said first and second positions, respectively, whereby the bundled extent of the flexible and elongated means intermediate the first and second positions can twist to accommodate pivotal movement of the cab.

2. The combination of claim 1, wherein said pivotal axis is horizontal and is spaced a substantial interval forwardly of the motive power system, and wherein substantial displacement of an indicator means and the sensor associated therewith occurs when the cab is pivoted from its operative to its inoperative position.

3. The combination of claim 2, including a tubular housing extending between the first and second positions and housing the bundled extent of the flexible and elongated means.

4. The combination of claim 1, wherein the vehicle includes a pair of dirigible front wheels and a steering means therefor, said steering means comprising a steering linkage mounted on the frame, a steering wheel rotatably mounted on and movable with the cab, and means for detachably and operatively connecting the steering wheel to the steering linkage.

5. The combination of claim 1, including a power control for and carried by the motive power system, actuating means for the power control carried by and movable with the cab, and means detachably and operatively connecting the actuating means to power control.

6. The combination of claim 1, including brake means for the wheeled frame, a brake actuator means for the brake means carried by and movable with the cab, and means detachably and operatively connecting the brake actuator means to the brake means.

7. The combination of claim 1, including hydraulic means for moving the cab from its operative position to its maintenance position.

8. The combination of claim 7, wherein said hydraulic means comprises a hydraulic cylinder and piston rod combination extensibly extending between first and second positions, said combination being pivotally connected at said one position to the frame, guide means fixed in position relative to said cab for guidingly engaging the hydraulic combination at said second position so that the cab is pivotally swung upwardly and forwardly on hydraulic extension of the hydraulic combination to the maintenance position.

9. The combination of claim 8, wherein the guide means is elongated and tubular and is provided with an elongated slot opening thereinto, said guide means being engaged to the hydraulic combination by structure that includes the latter being provided at said second position with a guided element that extends through said slot and which is movably and guidingly received within the tubular guide means.

10. The combination of claim 9, including means for detachably securing the hydraulic combination at its second position to the guide means, and means for selectively securing the cab against pivotal movement relative to the frame, whereby the cab can be raised by the hydraulic means, secured in maintenance position, and the hydraulic combination detached and swung to an unobstructive position while the cab remains elevated in its maintenance position.

11. In a self propelled vehicle of the type that includes a wheeled frame with a motive power system supported on the frame, a vehicle operator cab pivotally mounted on the frame for movement between an operating position that substantially obstructs ready maintenance access to the motive power system from above the latter and a maintenance position exposing the motive power system for ready maintenance access from above the latter, with hydraulic means being provided to move the cab from its operative to its maintenance position; the combination therewith of an improvement comprising a hydraulic cylinder and piston rod combination extensibly extending between first and second positions, said combination being pivotally connected at said one position to the frame, guide means fixed in position relative to said cab for sliding and guiding engaging the hydraulic combination at said second position so that the cab is pivotally swung upwardly and forwardly on hydraulic extension of the hydraulic combination to the maintenance position, said guide means being elongated and tubular and being provided with an elongated slot opening thereinto, said guide means being engaged to the hydraulic combination by structure that includes the latter being provided at said second position with a guided element that extends through said slot and which is movably and guidingly received within the tubular guide means, means for detachably securing the hydraulic combination at its second position to the guide means, and means for selectively securing the cab against pivotal movement relative to the frame, whereby the cab can be raised by the hydraulic means, secured in maintenance position, and the hydraulic combination detached and swung to an unobstructive position while the cab remains elevated in its maintenance position.

* * * * *